US012784981B2

(12) United States Patent
Yamamoto et al.

(10) Patent No.: US 12,784,981 B2

(45) Date of Patent: Nov. 3, 2026

(54) ELECTRONIC COMPONENT

(71) Applicant: Murata Manufacturing Co., Ltd., Nagaokakyo (JP)

(72) Inventors: Kazuyuki Yamamoto, Nagaokakyo (JP); Hiroki Homma, Nagaokakyo (JP); Sui Uno, Nagaokakyo (JP); Mitsunori Inoue, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 212 days.

(21) Appl. No.: 18/828,159

(22) Filed: Sep. 9, 2024

(65) Prior Publication Data

US 2024/0428995 A1 Dec. 26, 2024

Related U.S. Application Data

(63) Continuation of application No. PCT/JP2023/006550, filed on Feb. 22, 2023.

(30) Foreign Application Priority Data

Mar. 10, 2022 (JP) ................................ 2022-037424

(51) Int. Cl.
*H01G 4/232* (2006.01)
*H01G 4/30* (2006.01)

(52) U.S. Cl.
CPC ............... *H01G 4/232* (2013.01); *H01G 4/30* (2013.01)

(58) Field of Classification Search
CPC ........ H01G 4/012; H01G 4/12; H01G 4/1209; H01G 4/232; H01G 4/2325; H01G 4/30
See application file for complete search history.

(56) References Cited

U.S. PATENT DOCUMENTS

| | | | | |
|---|---|---|---|---|
| 2015/0116901 | A1 | 4/2015 | Sasaoka | |
| 2016/0024346 | A1 | 1/2016 | Inoue et al. | |
| 2019/0096577 | A1 | 3/2019 | Uenishi et al. | |
| 2024/0371572 | A1 * | 11/2024 | Nishibayashi ........... | H01G 4/01 |

FOREIGN PATENT DOCUMENTS

| | | | |
|---|---|---|---|
| JP | 2008300769 | A | 12/2008 |
| JP | 2012069912 | A | 4/2012 |
| JP | 2015111655 | A | 6/2015 |
| JP | 2016031988 | A | 3/2016 |

(Continued)

OTHER PUBLICATIONS

WO-2025203502-A1 Machine Translation (Year: 2025).*
International Search Report in PCT/JP2023/006550, mailed May 23, 2023, 2 pages.

*Primary Examiner* — Nathan Milakovich
(74) *Attorney, Agent, or Firm* — Keating & Bennett, LLP

(57) ABSTRACT

An electronic component includes a ceramic body, and an external electrode provided at an end of the ceramic body. Two adjacent side surfaces and an end surface of the ceramic body are in contact with each other to define a corner of the ceramic body, the external electrode includes a base layer covering the end surface and side surfaces including the two adjacent side surfaces except for the corner, and a plating layer covering the base layer and the corner, and the plating layer covering the corner has a thickness larger than a thickness of the plating layer covering a center of the end surface.

9 Claims, 8 Drawing Sheets

(56) References Cited

FOREIGN PATENT DOCUMENTS

| | | | | | |
|---|---|---|---|---|---|
| JP | 2019062100 | A | | 4/2019 | |
| JP | 2019149410 | A | | 9/2019 | |
| JP | 2021190546 | A | | 12/2021 | |
| KR | 20190036479 | A | | 4/2019 | |
| WO | WO-2025203502 | A1 | * | 10/2025 | ............... H01G 4/30 |

* cited by examiner

FIG. 7B Comparative Example

ELECTRONIC COMPONENT

CROSS REFERENCE TO RELATED APPLICATIONS

This application is a Continuation application of PCT Application No. PCT/JP2023/006550, filed on Feb. 22, 2023, and claims the benefit of priority to Japanese Patent Application No. 2022-037424, filed on Mar. 10, 2022. The entire contents of each application are hereby incorporated herein by reference.

BACKGROUND OF THE INVENTION

1. Field of the Invention

The present invention relates to electronic components.

2. Description of the Related Art

As a chip-type ceramic electronic component, one including external electrodes at both ends of a ceramic body is known (for example, Japanese Patent Application Laid-Open No. 2016-31988 and Japanese Patent Application Laid-Open No. 2012-69912). Each external electrode includes a base layer (for example, a conductive layer obtained by applying and baking a conductive paste containing Cu, Ni, Ag, Pd, or the like as a main component) provided on a surface of the ceramic body, and a plating layer (for example, a Ni plating layer) formed on a surface of the base layer.

In an electronic component such as a multilayer ceramic capacitor, it is desired to reduce the thickness of the base layer of the external electrode. With a thinned base layer, the dimensions of the ceramic body can be increased and the number of internal electrodes can be increased without changing the external dimensions of the electronic component. This may improve the performance of the electronic component.

When a base layer covering an end (including an end surface and a portion of a side surface) of the ceramic body is formed, the thickness of the base layer covering the corner (portion where an end surface and two side surfaces are in contact with each other) of the ceramic body tends to be thinner than the thickness of the base layer covering the end surface and the side surface excluding the corner. Thus, when the base layer is thinned, the base layer covering the corners of the ceramic body becomes too thin, and the corners may be exposed from the base layer.

Normally, the plating layer is not formed at the corners of the ceramic body exposed from the base layer since the plating layer is formed on a surface of the conductive base layer. However, by increasing the plating time, the plating layer formed on a surface of the base layer covering the periphery of the corners can be further expanded to the surface of the corners.

However, the plating layer covering the surface of the corners is thin, and the bonding force with the ceramic body is weak. Thus, a gap is likely to be generated between the corners of the ceramic body and the plating layer. When the plating time is not enough, the plating layer cannot fully cover the corners of the ceramic body, and pinholes may be generated in the plating layer.

The presence of pinholes in the plating layer causes infiltration of a plating solution into the plating layer. Since the plating solution may damage the ceramic body and the internal electrode, infiltration of the plating solution may cause a risk of deteriorating the reliability of the electronic component.

SUMMARY OF THE INVENTION

Example embodiments of the present invention provide electronic components each able to reduce or prevent the formation of pinholes in a plating layer with a base layer not fully covering the corners of a ceramic body.

According to an example embodiment of the present invention, an electronic component includes a ceramic body, and an external electrode provided at an end of the ceramic body. Two adjacent side surfaces and an end surface of the ceramic body are in contact with each other to define a corner of the ceramic body. The external electrode includes a base layer covering the end surface and a plurality of side surfaces including the two side surfaces except for the corner, and a plating layer covering the base layer and the corner. The plating layer covering the corner has a thickness larger than a thickness of the plating layer covering a center of the end surface.

According to example embodiments of the present invention, the formation of pinholes in the plating layer are able to be reduced or prevented with the base layer not fully covering the corners of the ceramic body.

The above and other elements, features, steps, characteristics and advantages of the present invention will become more apparent from the following detailed description of the example embodiments with reference to the attached drawings

BRIEF DESCRIPTION OF THE DRAWINGS

FIG. 7B is a micrograph of a section of an electronic component prepared in Comparative Example.

DETAILED DESCRIPTION OF THE EXAMPLE EMBODIMENTS

Figure 1A:
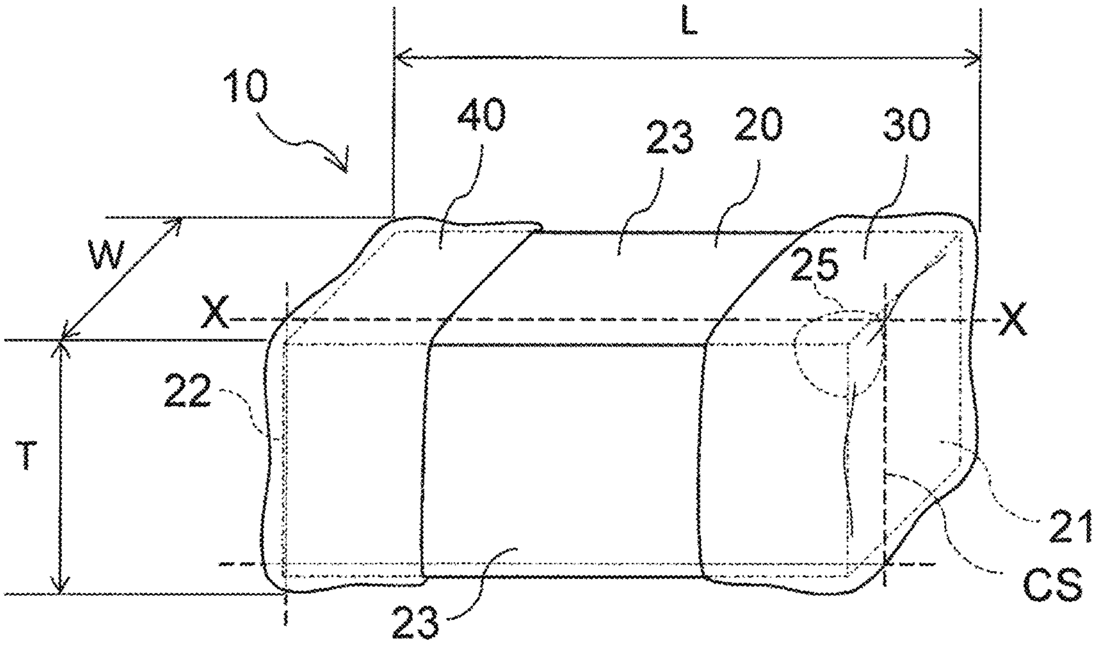
FIG. 1A is a schematic perspective view of an electronic component according to an example embodiment of the present invention.

Example embodiments of the present invention will be described in detail below with reference to the drawings.

An electronic component according to an example embodiment of the present invention includes a ceramic body and an external electrode provided on a surface of the ceramic body. The external electrode includes a base layer covering the surface of the ceramic body, and a plating layer covering the base layer. Two adjacent side surfaces and an end surface of the ceramic body are in contact with each other to define a corner of the ceramic body. The base layer of the external electrode covers the end surface and a plurality of side surfaces including the two side surfaces of the ceramic body except for the corner of the ceramic body. A portion of the corner or the entire corner of the ceramic body may be exposed from the base layer.

When the plating layer is provided on a surface of the base layer, the plating layer is only barely provided on the surface of the corner of the ceramic body, which causes generation of pinholes in the plating layer. In addition, since the bonding force between the corner of the ceramic body and the plating layer is low, a gap is likely to be generated between them. When there is a defect (pinholes, gaps, etc.) in the plating layer, a plating solution may infiltrate into the plating layer from the defect. Since the infiltrated plating solution may damage the ceramic body, the reliability of the electronic component may deteriorate.

In the electronic component according to the present example embodiment of the present invention, the thickness of the plating layer covering the corner of the ceramic body is larger than the thickness of the plating layer covering the center of the end surface, thus reducing or preventing the occurrence of defects in the plating layer.

As long as the electronic component includes a ceramic body and an external electrode provided on a surface of the ceramic body, the shape, dimensions, and material of the ceramic body, and the number, arrangement, shape, and the like of the external electrode are not particularly limited. An internal electrode may be embedded in the ceramic body, but it does not have to be embedded in the ceramic body. When the internal electrode is present, the internal electrode is electrically connected to the external electrode in an appropriate manner.

Examples of the electronic component to which the configuration of the present example embodiment of the present invention can be applied include a surface mounting type electronic component, in particular, a chip component, and more specifically, a capacitor such as a multilayer ceramic capacitor, a positive characteristic (or positive temperature coefficient, PTC) thermistor, and a negative characteristic (or negative temperature coefficient, NTC) thermistor, varistor, and capacitor.

In the following example embodiment, a multilayer ceramic capacitor including an internal electrode will be exemplified and described in detail with reference to the drawings.

EXAMPLE EMBODIMENT

Figure 1B:
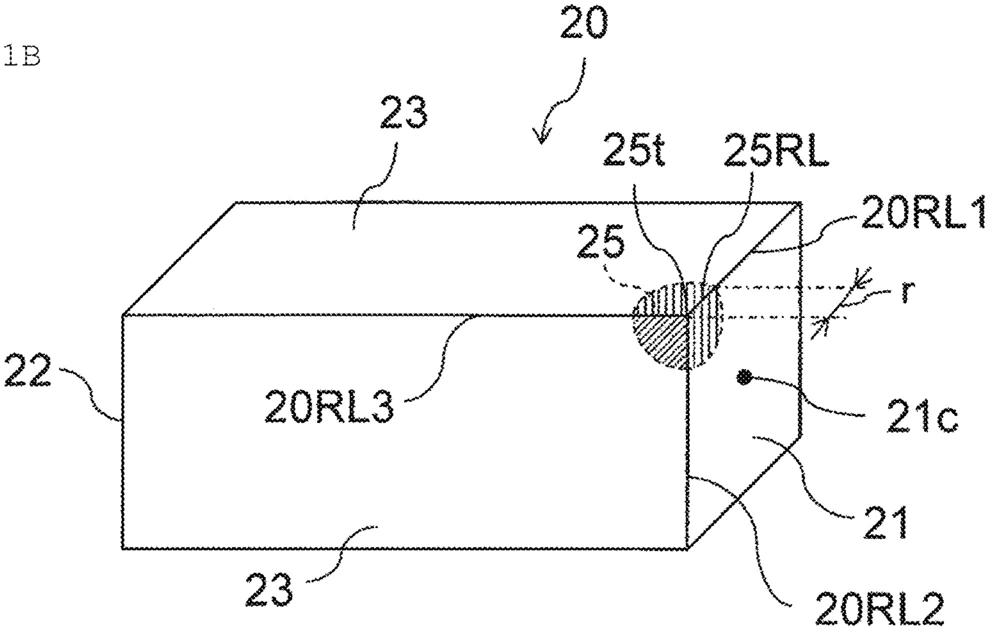
FIG. 1B is a schematic perspective view of a ceramic body used in the electronic component of FIG. 1A.
Figure 2:
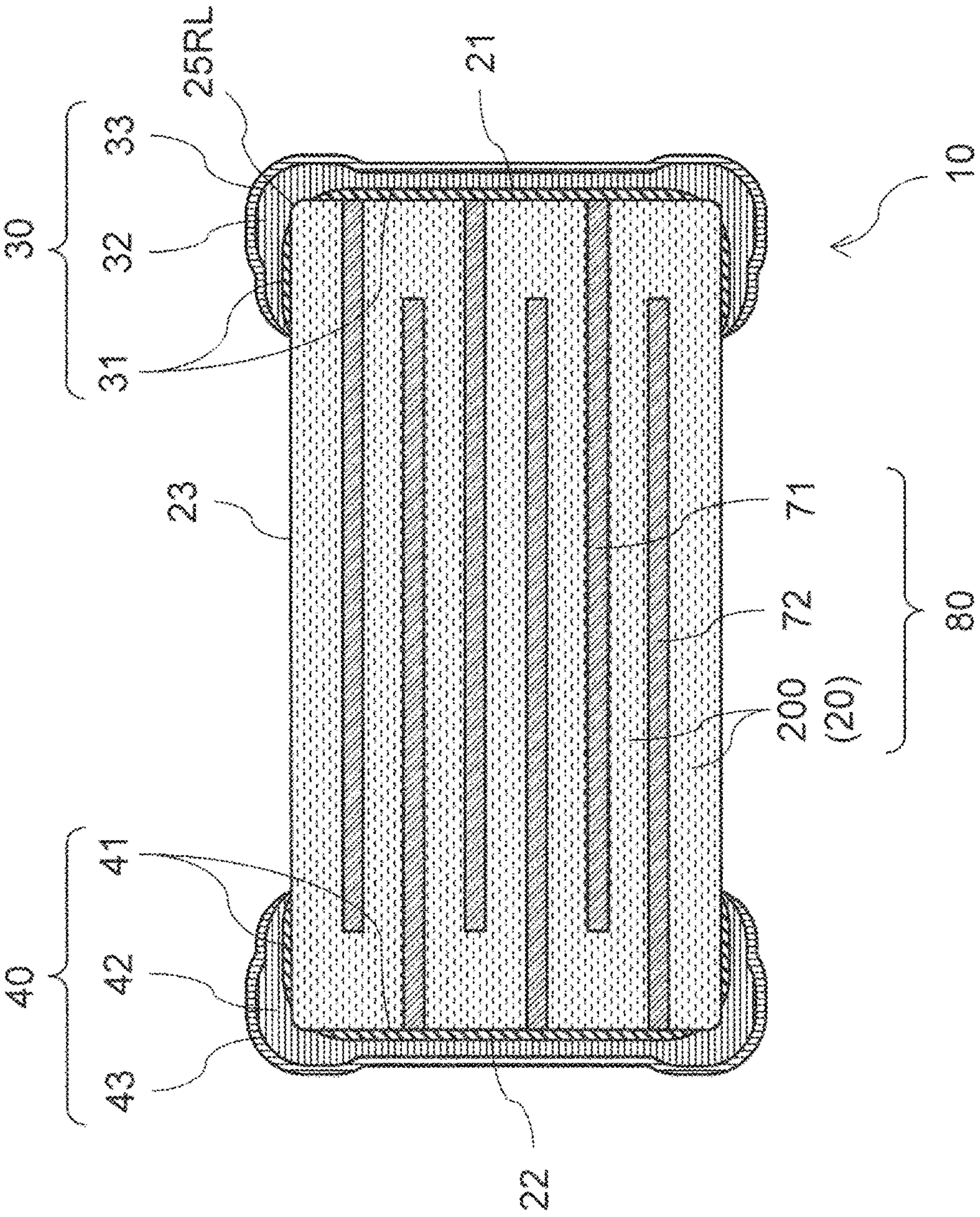
FIG. 2 is a schematic sectional view of the electronic component taken along the line X-X in FIG. 1A.
Figure 3:
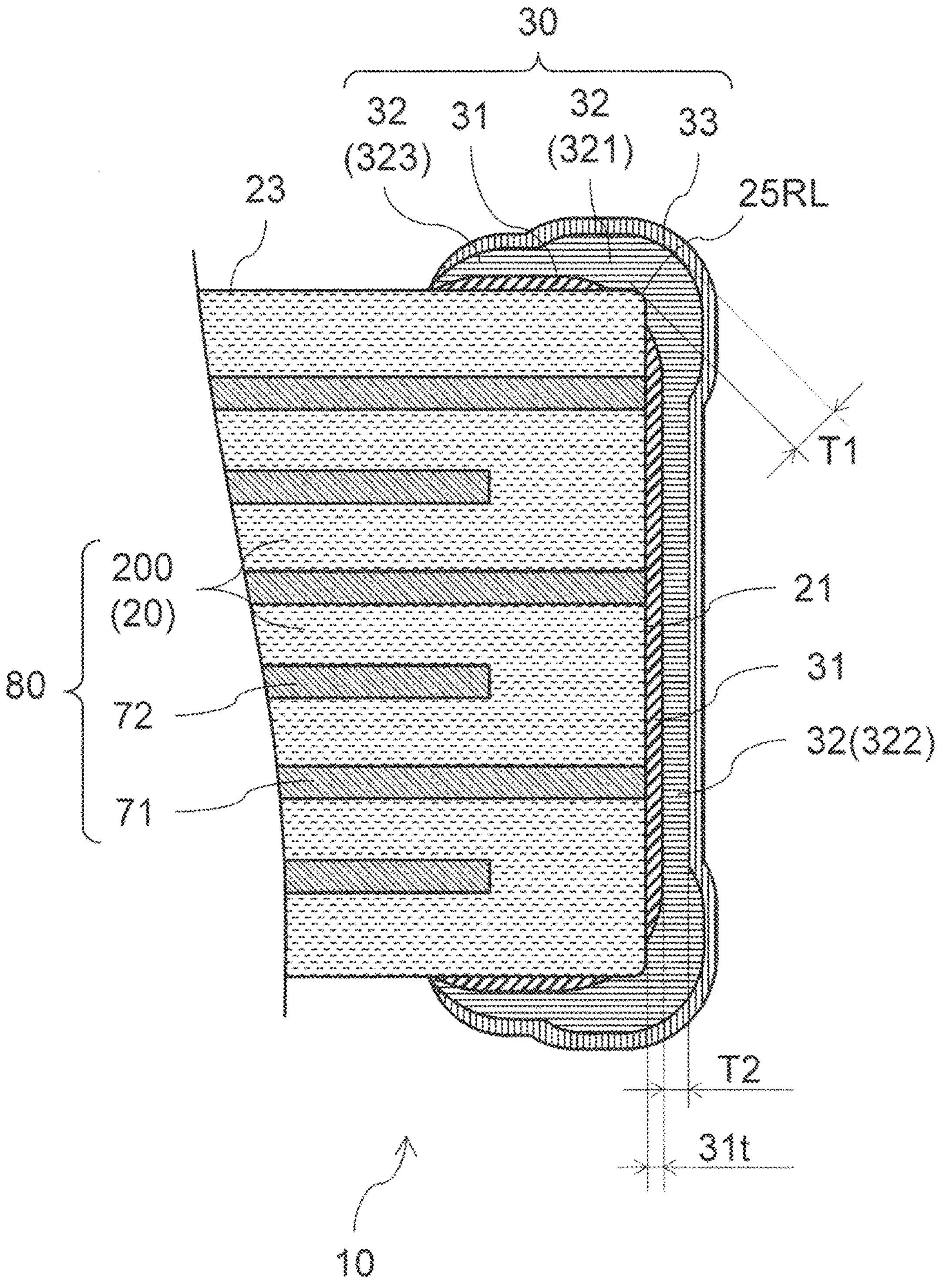
FIG. 3 is an enlarged sectional view schematically illustrating a portion of the electronic component in FIG. 2.
Figure 4:
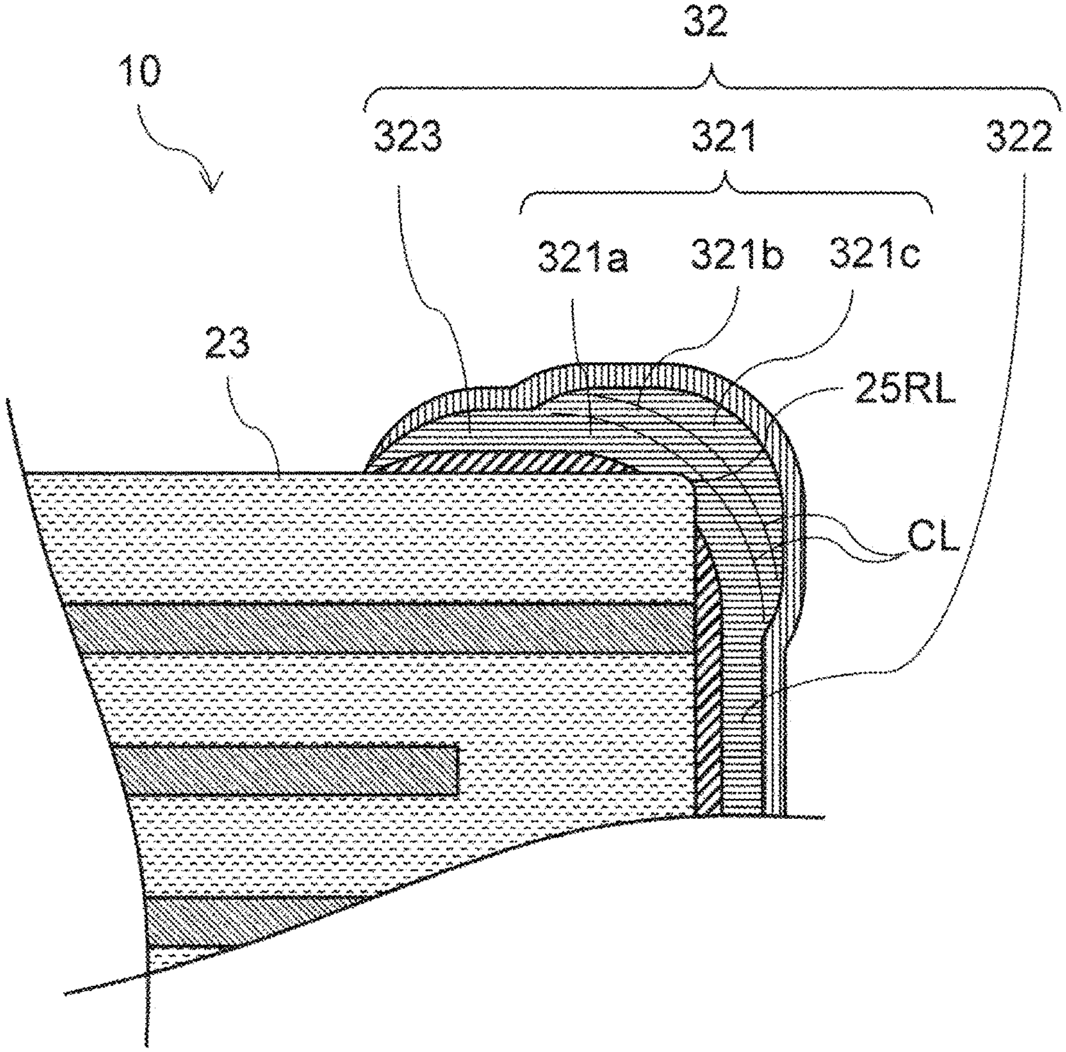
FIG. 4 is an enlarged sectional view schematically illustrating a portion of the electronic component in FIG. 3.

FIG. 1A is a schematic perspective view of an electronic component 10 according to an example embodiment of the present invention, and FIG. 1B is a schematic perspective view of a ceramic body 20 used in the electronic component 10 of FIG. 1A. FIG. 2 is a schematic sectional view of the electronic component 10 taken along the line X-X in FIG. 1A. FIG. 3 is an enlarged schematic sectional view of a portion of the electronic component 10 illustrated in FIG. 2, and FIG. 4 is an enlarged schematic sectional view of a portion of the electronic component 10 illustrated in FIG. 3.

The electronic component 10 illustrated in FIGS. 1A and 2 is, for example, a multilayer ceramic capacitor. The electronic component 10 includes the ceramic body 20 and external electrodes 30 and 40 provided at ends of the ceramic body 20. The external electrodes 30 and 40 include base layers 31 and 41 and plating layers 32 and 42. If so desired, the external electrodes 30 and 40 can further include second plating layers 33 and 43 covering the plating layers 32 and 42.

The ceramic body 20 of the multilayer ceramic capacitor includes a plurality of ceramic layers 200 (see FIG. 2). Internal electrodes 71 and 72 are provided inside the ceramic body 20. The internal electrodes 71 and 72 and the ceramic layers 200 are alternately laminated to define a laminate 80. The internal electrodes 71 and 72 are respectively exposed from the end surfaces 21 and 22 of the ceramic body 20 and are electrically connected to the external electrodes 30 and 40.

Each configuration will be described in detail below.

Ceramic Body 20

As illustrated in FIG. 1B, the ceramic body 20 according to the present example embodiment preferably has a rectangular or substantially rectangular parallelepiped shape, and it includes two end surfaces 21 and 22 opposing each other and four side surfaces 23. In FIG. 1B, the internal electrodes 71 and 72 exposed from the end surfaces 21 and 22 are omitted to simplify the drawing.

Two adjacent side surfaces 23 and one of the end surfaces (end surface 21 in FIG. 1B) of the ceramic body 20 are in contact with each other to define a corner 25 (hatched region) of the ceramic body 20.

The "corner 25 of the ceramic body 20" in the present specification is a region including a vertex 25*t* where the two side surfaces 23 intersect with an end surface, and a portion surrounding the vertex 25*t*, and the corner has a certain extent (see FIG. 1B).

The corner 25 may be, for example, a range surrounded by an arc drawn with a radius r on the side surface 23 and the end surface 21 around the vertex 25*t*. The dimension (radius r) of the corner 25 can be appropriately set according to the dimension of the electronic component 10. For example, in the case of the electronic component 10 of 0603 size, the dimension (radius r) of the corner 25 can be set to about ⅕ (that is, about W/5) of the width W of the electronic component 10.

As described later, the corner 25 (more precisely, a ridge 25RL of the corner 25) is covered with a first plating region 321 of the plating layer 32. Thus, a range surrounded by an arc in which a length 321R (FIG. 5B) of the first plating region 321 is drawn as the radius r may be defined as the corner 25 of the ceramic body 20.

Base Layer 31

As illustrated in FIGS. 2 to 4, the base layer 31 of the external electrode 30 covers the side surface 23 and the end surface 21 except for the corner 25 (FIG. 1A) of the ceramic body 20.

The corner 25 of the ceramic body 20 may be fully exposed from the base layer 31 (that is, the corner 25 does not have to be covered with the base layer 31 at all). Alternatively, only a portion of the corner 25 may be exposed from the base layer 31, and the remaining portion may be covered with the base layer 31. As an example, since the base layer 31 covering the corner 25 is extremely thin, the base layer 31 does not have to form a continuous film (that is, a plurality of holes may be formed in the base layer 31, and a portion of the corner 25 may be exposed from the holes). In another example, there may be a case where only the vicinity of the vertex 25*t* (FIG. 1B) of the corner 25 is exposed from the base layer 31, and the other portion of the corner 25 is covered with the base layer 31.

The thickness of the base layer 31 does not have to be uniform. For example, the base layer 31 covering the corner 25 of the ceramic body 20 or the vicinity thereof may be relatively thin, and the base layer 31 covering the other portion may be relatively thick.

The base layer 31 is provided to form the plating layer 32 by, for example, electrolytic plating. Thus, it is preferable that the thickness of the base layer 31 is a thickness sufficient for performing electrolytic plating and is as thin as possible. Specifically, a thickness 31*t* of the base layer 31 is, for example, preferably about 0.1 μm or more and about 10 μm or less. Thinning the base layer 31 makes it possible to reduce the thickness (total thickness of the base layer 31, the plating layer 32, and the second plating layer 33) of the external electrode 30.

In the present specification, the "thickness 31*t* of the base layer 31" refers to the maximum thickness of the base layer 31. The thickness 31*t* of the base layer 31 generally coincides with the thickness of the plating layer covering a center 21*c* of the end surfaces 22 and 21 of the ceramic body 20.

Plating Layer 32

The plating layer 32 of the external electrode 30 covers the base layer 31 and a portion of the corner 25 of the ceramic body 20 exposed from the base layer 31.

The plating layer 32 includes three regions of a plating layer (first plating region) 321 covering the corner 25 of the ceramic body 20, a plating layer (second plating region) 322 provided on the end surfaces 21 and 22 side of the ceramic body 20, and a plating layer (third plating region) 323 provided on the side surface 23 side of the ceramic body 20.

Thickness T1 of First Plating Region 321

As illustrated in FIG. 3, a thickness T1 of the plating layer 32 (first plating region 321) covering the corner 25 is larger than a thickness T2 of the plating layer 32 covering the center 21*c* (FIG. 1B) of the end surface 21.

Forming the plating layer 32 to be locally thick in the first plating region 321 covering the corner 25 makes it possible to reduce or prevent the occurrence of defects (pinholes in the plating layer 32, gaps between the plating layer 32 and the ceramic body 20, etc.) in the first plating region 321. As a result, when the plating layer 32 is formed, it is possible to reduce or prevent infiltration of a plating solution from the defects in the plating layer 32 and a damage to the ceramic body 20 and the internal electrodes 71 and 72.

The thickness T1 of the first plating region 321 and the thickness T2 of the plating region 32 covering the center 21*c* of the end surface 21 of the ceramic body 20 are measured as follows.

First, the electronic component 10 is cut along a section CS parallel to the LT plane (section taken along the line X-X in FIG. 1A). The position of the section CS is determined such that the section passes through the corner 25 and the internal electrodes 71 and 72 disposed inside the ceramic body 20 are exposed. Instead of cutting the electronic component 10 along the section CS, the electronic component 10 may be polished to the section CS.

FIG. 3 illustrates a section of the electronic component 10 taken along the section SC. The ceramic body 20 illustrated in FIG. 3 includes the side surface 23, the end surface 21, and the ridge 25RL where the side surface and the end surface intersect with each other.

Here, the ridge 25RL will be described with reference to FIG. 1B. The ceramic body 20 includes ridges 20RL1 and 20RL2 where the side surface 23 and the end surface 21 are in contact with each other, and a ridge 20RL3 where the two adjacent side surfaces 23 are in contact with each other. Some of these ridges pass through the corner 25. A ridge within the range of the corner 25 is referred to as a "ridge 25RL of the corner 25".

See FIG. 3 again. The thickness T1 of the first plating region 321 covering the corner 25 is a distance from the ridge 25RL of the corner 25 of the ceramic body 20 to the outer surface of the first plating region 321 in the sectional view (FIG. 3) of the electronic component 10. The ridge 25RL of the corner 25 may be a curved surface (drawn as a curve in FIG. 3) because of removal of an edge during manufacturing.

Strictly speaking, the thickness T2 of the plating layer 32 covering the center 21*c* of the end surface 21 of the ceramic body 20 needs to be measured in a section of the electronic component 10 cut along a plane passing through the center 21*c* of the end surface 21. However, the second plating region 322 illustrated in FIG. 3 and the plating layer 32 covering the center 21*c* of the end surface 21 have substantially the same thickness. Thus, the thickness of the second plating region 322 in the sectional view of FIG. 3 is regarded as the thickness of the plating layer 32 covering the center 21*c* of the end surface 21. Hereinafter, the thickness of the plating layer 32 covering the center 21*c* of the end surface 21 may be referred to as a thickness T2 of the second plating region 322.

The thickness T1 of the first plating region 321 covering the corner 25 is, for example, preferably about 1.5 times or more the thickness (that is, the thickness of the second plating region 322) T2 of the plating layer 32 covering the center 21*c* of the end surface 21. This configuration sufficiently increases the thickness T1 of the first plating layer 321 covering the corner 25 and further improves the reducing or preventing effect of reducing or preventing infiltration of the plating solution into the plating layer 32.

More preferably, the thickness T1 of the first plating region 321 is, for example, about twice or more the thickness T2 of the second plating region 322, and still more preferably 3 times or more and 6 times or less.

Multilayer Structure of First Plating Region 321

As illustrated in FIG. 4, the first plating region 321 covering the corner 25 preferably includes a multilayer film obtained by stacking a plurality of plating films. In FIG. 4, the first plating region 321 includes three plating films 321*a*, 321*b*, and 321*c*. Forming the multilayer film makes it possible to easily increase the thickness T1 of the first plating region 321.

The multilayer film is preferably formed by stacking 2 or more and 10 or less plating films, and more preferably formed by stacking 2 or more and 4 or less plating films.

The number of layers of the plating film defining the first plating region 321 (multilayer film) is calculated as (the number of cracks CL)+1. In FIG. 4, since there are two cracks CL, the plating film is counted as "three layers".

Figure 7A:
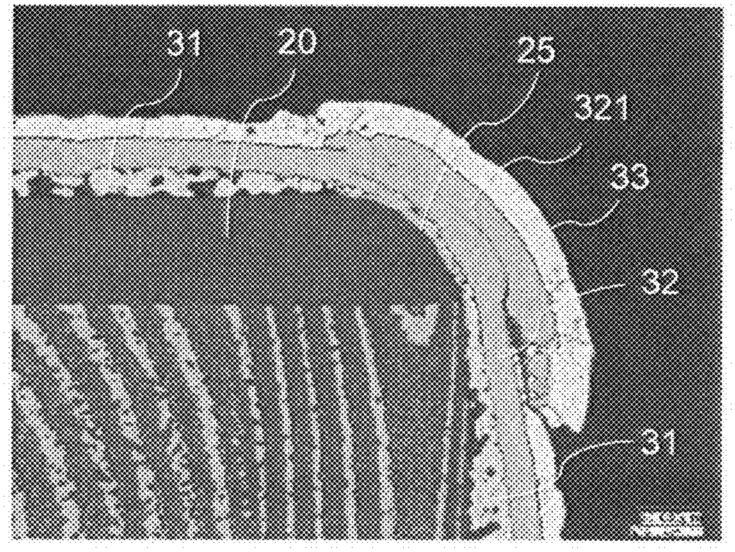
FIG. 7A is a micrograph of a section of an electronic component prepared in Example.
Figure 7A:
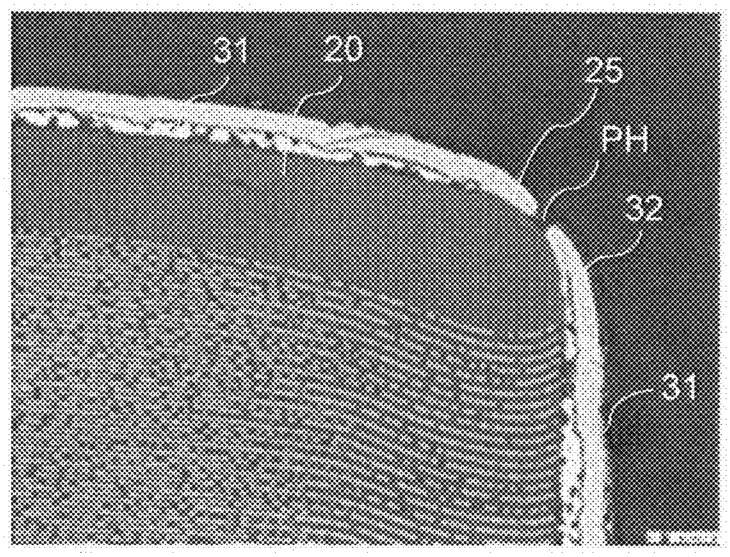
Figure 8:
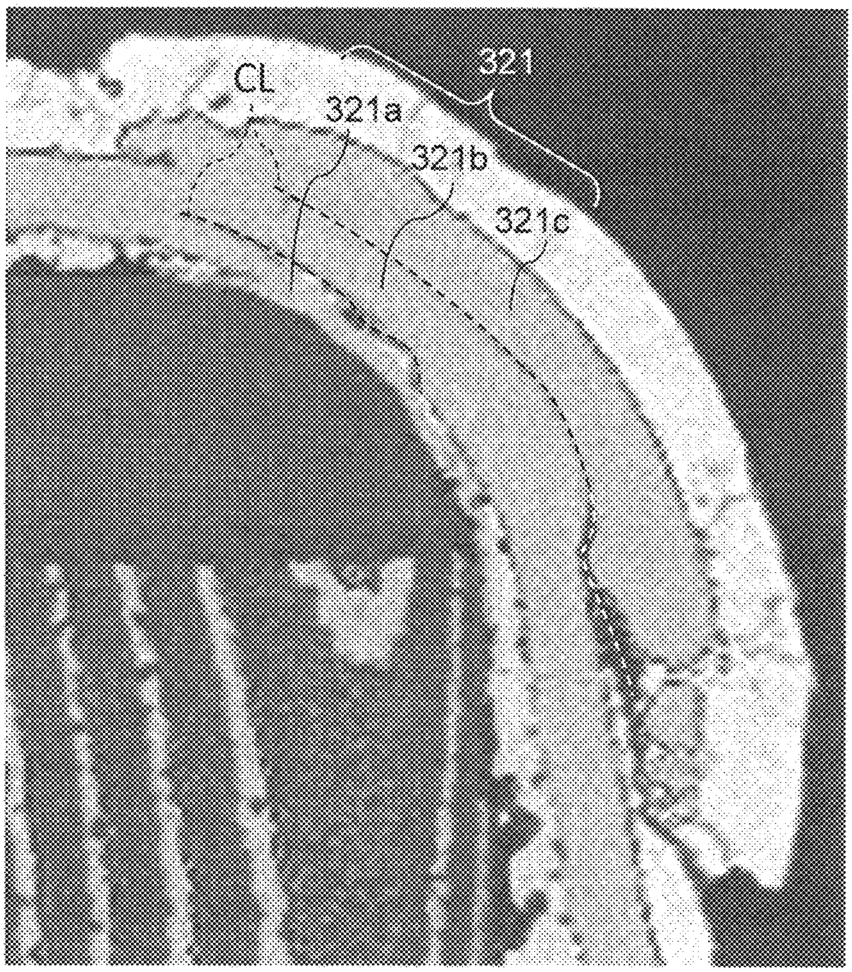
FIG. 8 is an enlarged photograph obtained by enlarging a portion of the microphotograph of FIG. 7A.

The crack CL can be confirmed by observing a section of the first plating region 321 with a microscope (microscope or optical microscope) (FIGS. 7A and 8). The first plating region 321 is observed with a microscope at a magnification of about 100 times or more, and when a gap having a width of, for example, about 1 μm or more is continuous by about 1 μm or more, it is determined as the "crack CL".

Length 321R of First Plating Region 321

Figure 5A:
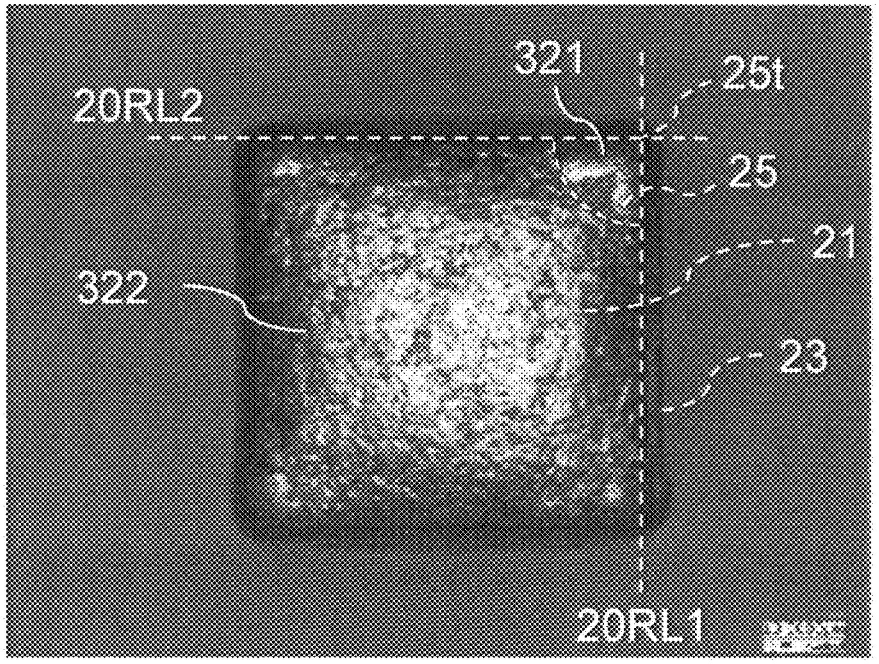
FIG. 5A is a micrograph from an end surface side of the electronic component according to an example embodiment of the present invention.
Figure 5B:
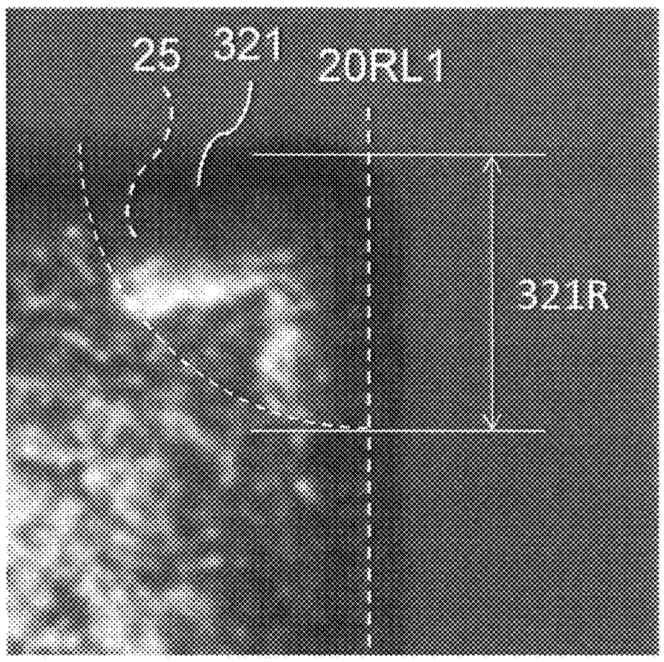
FIG. 5B is an enlarged photograph in which a portion of FIG. 5A is enlarged.

FIG. 5A is a micrograph from the end surface 21 side of the electronic component 10 according to Example 1 described later, and FIG. 5B is an enlarged micrograph of a portion of FIG. 5A. As illustrated in FIG. 5B, the dimension of the first plating region 321 along the ridge 20RL1 of the ceramic body 20 is referred to as a "length 321R". The length 321R of the first plating region 321 is, for example, about 0.1 μm or more and about 100 μm or less. The length 321R of the first plating region 321 is, for example, more preferably about 20 μm or more and about 60 μm or less.

The length 321R of the first plating region 321 is measured as follows.

In FIGS. 5A and 5B, the side surface 23 of the ceramic body 20, the end surface 21 of the ceramic body 20, and the ridges 20RL1 and 20RL2 of the ceramic body 20 are drawn. The side surface 23 and the end surface 21 are in contact with each other at the ridge 20RL1 or the ridge 20RL2 of the ceramic body 20 (see also FIG. 1B). As illustrated in FIGS. 5A and 5B, the plating layer 32 (first plating region 321) covering the corner 25 of the ceramic body 20 covers the vertex 25*t* of the corner 25 of the ceramic body 20, and further extends along each of the ridges 20RL1 and 20RL2 of the ceramic body 20. In the end surface view as illustrated in FIG. 5A, the first plating region 321 has an L shape, for example.

The ceramic body 20 has the ridge 20RL3 where two adjacent side surfaces 23 are in contact with each other (see FIG. 1B). The first plating region 321 further covers the vertex 25*t* of the corner 25 of the ceramic body 20 and extends along the ridge 20RL3 of the ceramic body 20.

The length 321R of the first plating region 321 along the ridge 20RL1 of the ceramic body 20 is equal or substantially equal to the length of the first plating region 321 measured along each of the other ridges 20RL2 and 20RL3. Thus, when the length of the first plating region 321 is measured, the length may be measured along any ridge.

As can be seen from FIGS. 5A and 5B, the first plating region 321 and the second plating region 322 have different thicknesses and surface properties, and thus, when observed with a microscope (microscope or optical microscope), the color tones of these regions look different. Thus, the range of the first plating region 321 can be specified based on the color tone. After the range of the first plating region 321 is specified, the length of the first plating region 321 is measured.

In the electronic component 10 according to the present example embodiment, the base layers 31 and 41 can be thinned without generating defects (pinholes, gaps, etc.) in the plating layers 32 and 42. Thus, for the following reasons, the electronic component is particularly suitable for the electronic component 10 including the internal electrodes 71 and 72 inside the ceramic body 20, such as the multilayer ceramic capacitor illustrated in FIG. 2.

In the multilayer ceramic capacitor, the thicknesses of the external electrodes 30 and 40 can be reduced by thinning the base layers 31 and 41. Thus, the number of the internal electrodes 71 and 72 can be increased without changing the external dimensions of the electronic component 10. This makes it possible to improve the capacitance of the multilayer ceramic capacitor.

In other electronic components (multilayer thermistors and the like) including internal electrodes, since the number of internal electrodes can be increased, the electrical characteristics of the electronic components can be improved.

Method for Manufacturing Electronic Component 10

An example of a method for manufacturing the electronic component 10 according to the present example embodiment will be described by taking a multilayer ceramic capacitor having the structure illustrated in FIG. 2 as an example.

Preparation of Ceramic Body 20 and Internal Electrodes 71 and 72

First, the ceramic body 20 including the internal electrodes 71 and 72 is prepared. Ceramic body 20 can be prepared by any suitable method.

The ceramic body 20 (more specifically, the ceramic layers 200) is formed of a ceramic material suitable for the electronic component to be manufactured. For example, in a multilayer ceramic capacitor, the ceramic body 20 is formed of a dielectric ceramic material (for example, $BaTiO_3$, $CaTio_3$, $SrTiO_3$, $CaZro_3$, $(BaSr)TiO_3$, $Ba(ZrTi)O_3$, $(BiZn)Nb_2O_7$, and the like).

The internal electrodes 71 and 72 are formed of a conductive material. Examples of suitable conductive materials include Ag, Cu, Pt, Ni, Al, Pd, and Au. Ag, Cu, and Ni are particularly preferable.

In the preparation of the ceramic body 20 and the internal electrodes 71 and 72, first, each raw material of the ceramic body 20 is weighed, put in a ball mill together with a pulverization medium (hereinafter, also referred to as PSZ ball) such as partially stabilized zirconia (PSZ) and pure water, and subjected to wet mixing and pulverizing. The obtained mixture is calcined at a predetermined temperature (e.g., about 1000° C. to about 1200° C.) to provide a calcined powder. An organic binder is added to the obtained calcined powder, and the resulting material is subjected to a wet mixing treatment to form a slurry, and then subjected to molding processing using a doctor blade method or the like to prepare a ceramic green sheet having a desired thickness.

Next, a conductive paste used to form the internal electrodes 71 and 72 is applied to a surface of the ceramic green sheet to form an internal electrode pattern. The conductive paste is prepared, for example, by dispersing metal powder and an organic binder in an organic solvent. The conductive paste is applied by, for example, screen printing or the like.

A predetermined number of the ceramic green sheets on which the internal electrode patterns are formed are laminated, then the laminate was sandwiched by ceramic green sheets on which the internal electrode patterns are not formed from upper and lower sides and subjected to pressure bonding. A laminate (laminate before sintering) in which the ceramic green sheets and the internal electrode patterns are alternately laminated is thus obtained. The laminate before sintering is cut into a predetermined size, then subjected to a degreasing treatment and a debinding treatment, and fired at a predetermined temperature (e.g., about 1200° C. to about 1400° C.) and in a predetermined atmosphere. The laminate 80 having a multilayer structure in which a plurality of ceramic layers 200 and internal electrodes 71 and 72 are alternately stacked is thus obtained. The laminate 80 can also be regarded as the ceramic body 20 incorporating the internal electrodes 71 and 72.

Formation of Base Layers 31 and 41

As illustrated in FIG. 2, base layers 31 and 41 are formed in such a manner as to cover the ends (as illustrated in FIG. 2, the end surfaces 21 and 22 of the ceramic body 20 and a portion of the side surface 23) of the ceramic body 20. The base layers 31 and 41 are in contact with the internal electrodes 71 and 72 exposed on the end surfaces 21 and 22 of the ceramic body 20.

The base layers 31 and 41 are formed of a metal material including Cu, Ag, Si, Ni, or the like, for example. In particular, it is preferable to form the base layers from a Cu film, for example.

The base layers 31 and 41 can be formed by a known film forming method. For example, a sputtering method, a vapor deposition method, a coating method (conductive paste is applied to a predetermined position and then baked), a dipping method, or the like can be used. For example, the Cu film is preferably formed by applying a Cu paste and then baking the paste.

By forming the Cu film thin, at least a portion of the corner 25 of the ceramic body 20 is exposed from the base layers 31 and 41.

Formation of Plating Layers 32 and 42

The plating layers 32 and 42 are formed in such a manner as to cover the base layers 31 and 41 and a portion of the corner 25 of the ceramic body 20 exposed from the base layer 31.

The plating layers 32 and 42 can be formed, for example, by performing electrolytic plating of at least one of Ni and Cu. For the plating layers 32 and 42, for example, a plating method capable of applying an impact to an object to be plated is used, such as a barrel plating method in which a conductive medium placed in a barrel and the ceramic body 20 are plated while being rotated and stirred, or a centrifugal plating method in which the ceramic body 20 is stirred and plated by a centrifugal force of a barrel. The plating layer 32 (first plating region 321) covering the corner 25 of the ceramic body 20 can be thus formed into a thick film.

Hereinafter, a mechanism used to thicken the first plating region 321 will be described in detail with reference to the drawings, taking a case where plating is performed by a centrifugal plating method as an example.

Figure 6A:
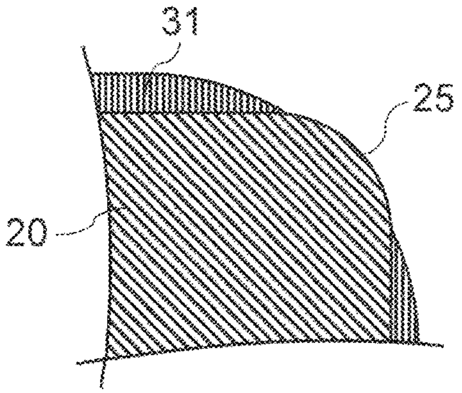
FIGS. 6A to 6F are schematic sectional views describing steps of forming a plating layer.

As illustrated in FIG. 6A, the base layers 31 and 41 are formed such that the corner 25 of the ceramic body 20 is exposed, and then the plating layer 32*a* is formed on the surfaces of the base layers 31 and 41 by a centrifugal plating method.

Figure 6B:
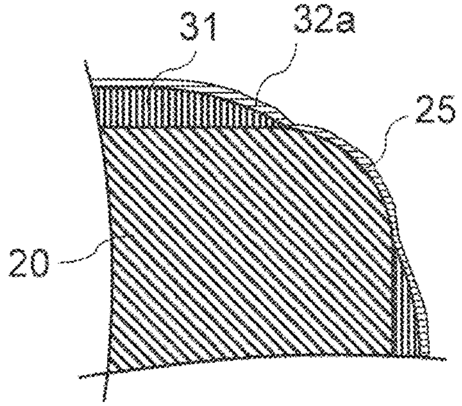

The plating layer 32*a* is first formed on the surfaces of the base layers 31 and 41, and expands to the surface of the corner 25 of the ceramic body 20 with time (FIG. 6B).

Figure 6C:
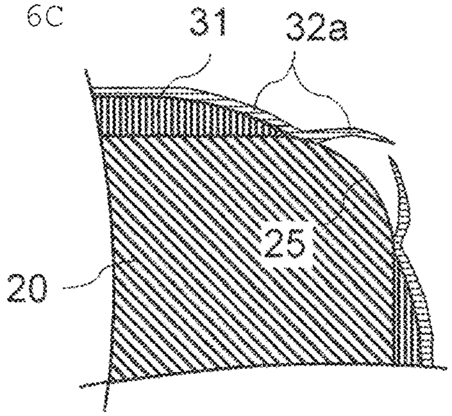

The plating layer 32*a* covering the corner 25 of the ceramic body 20 has a weak bonding force with the surface of the corner 25. The plating layer 32*a* is easily peeled off from the surface of the corner 25 because of the collision occurring between the ceramic bodies 20, between the ceramic body 20 and the conductive medium, and between the ceramic body 20 and the cathode during centrifugal plating, and because of friction generated when the ceramic body 20 is stuck to the cathode with centrifugal force (FIG. 6C). As a result, the corner 25 is exposed from the plating layer 32*a*. Since the bonding force between the plating layer 32*a* and the base layers 31 and 41 is strong, the plating layer 32*a* is peeled off only in a part.

Figure 6D:
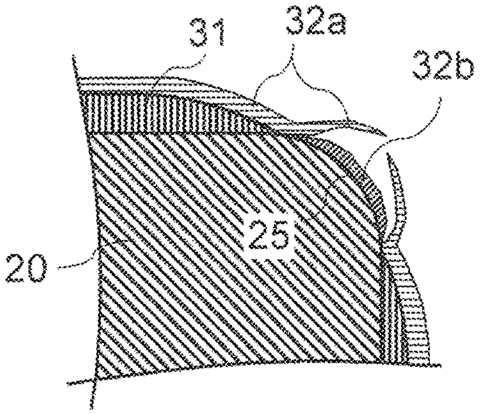

In a state where a portion of the plating layer 32*a* is peeled off, plating is further continued. With the base layers 31 and 41 and/or the previously formed plating layer 32*a* as a starting point, the plating layer 32*b* covering the surface of the corner 25 is formed again (FIG. 6D). The previously formed plating layer 32*a* increases in thickness. In particular, plating grows on both the inner side (the surface that was in contact with the surface of the corner 25 before peeling) and the outer side of the plating layer 32*a* peeled off from the corner 25.

Figure 6E:
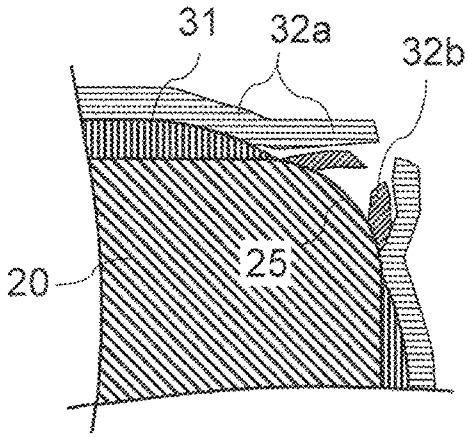

As in FIG. 6C, the plating layer 32*b* covering the corner 25 is easily peeled off from the surface of the corner 25 because of various types of collision and friction (as described above) that can be received by the ceramic body 20 during centrifugal plating (FIG. 6E).

Figure 6F:
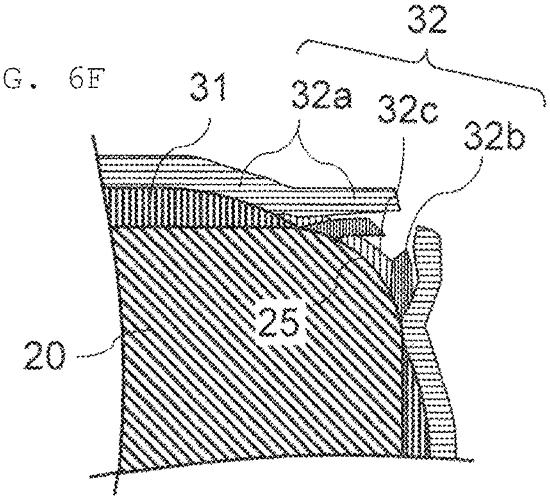

When plating is further continued in a state where the plating layer 32*b* is peeled off, the plating layer 32*c* covering the surface of the corner 25 is formed again with the base layers 31 and 41 and/or the previously formed plating layers 32*a* and 32*b* as a starting point (FIG. 6F). The previously formed plating layers 32*a* and 32*b* increase in thickness. In particular, in the peeled portions of the plating layers 32*a* and 32*b*, plating grows on both the inner side and the outer side.

By repeating formation and peeling of the plating layer covering the corner 25 like this, the plating layer 32 (first plating region 321) covering the corner 25 can be made thicker than the other portions of the plating layer 32 (second plating region 322, third plating region 323).

The thickness T1 of the first plating region 321 can be adjusted by the length of the plating time. Increasing the plating time makes it possible to increase the thickness T1 of the first plating region 321.

The number of layers of the plating films 321*a*, 321*b*, and 321*c* forming the first plating region 321 is determined by the number of times of peeling. The number of layers of the plating films 321*a*, 321*b*, and 321*c* can be controlled by controlling the number of times of peeling by adjusting the strength of the impact to be applied to the ceramic body 20 (more precisely, a plating film formed on the surface of the ceramic body 20) during centrifugal plating (for example, it can be adjusted by the rotation speed of the container (barrel) containing chips and a medium) and adjusting the plating time.

For example, the plating time is preferably in the range of about 30 minutes to about 600 minutes, and the rotation speed is preferably in the range of about 200 rpm to about 500 rpm.

Formation of Second Plating Layers 33 and 43

The second plating layers 33 and 43 are formed in such a manner as to cover the surfaces of the plating layers 32 and 42. The second plating layers 33 and 43 can be formed by, for example, performing electrolytic plating of Sn. The second plating layers 33 and 43 can be formed by a known plating method, and for example, a barrel plating method, a centrifugal plating method, or the like can be used.

EXAMPLES

A measurement sample was prepared by the following procedure.

Example 1

The ceramic body 20 was prepared by pulverizing and mixing of raw materials, calcining, molding, firing, and cutting. For the pulverization and mixing of the raw materials, $BaTiO_3$ as a main component was mixed in a predetermined amount then pulverized, and calcined at a maximum temperature of about 1200° C. in an air atmosphere. An organic binder was added to the obtained calcined powder and subjected to wet mixing, whereby a slurry was obtained. A ceramic green sheet having a desired thickness was prepared from the slurry by a doctor blade method. Next, a conductive paste (Ag paste) for the internal electrode was applied to a surface of the ceramic green sheet to form an internal electrode pattern. A predetermined number of the ceramic green sheets on which the internal electrode pattern was thus formed were laminated, then the obtained material was sandwiched by ceramic green sheets on which the internal electrode pattern was not formed from upper and lower sides and subjected to pressure bonding, whereby a laminate was prepared. This laminate was cut into a predetermined size, then subjected to a degreasing treatment and a debinding treatment, and then fired at a predetermined temperature (about 1200° C. to about 1400° C.) in a predetermined atmosphere, such that the laminate 80 having a multilayer structure including the ceramic body 20 and internal electrodes 71 and 72 was obtained.

The base layer 31 was formed by applying a Cu paste to an end of the ceramic body 20 and baking the paste. At this time, the corner 25 of the ceramic body 20 was exposed from the base layer 31 (FIGS. 7A and 8).

Subsequently, the plating layer 32 (Ni plating layer) covering the surface of the base layer 31 and the corner 25 of the ceramic body 20 was formed by centrifugal plating. At the time of centrifugal plating, the rotation speed of the barrel (container containing chips and a medium) was increased and the plating time was increased as compared with typical centrifugal plating conditions. Multilayering of the Ni plating layer was thus performed at the corner 25 of the ceramic body 20 which is susceptible to impact.

Further, the second plating layer 33 (Sn plating layer) covering the Ni plating layer was formed by centrifugal plating. The plating conditions were typical plating conditions.

A multilayer ceramic capacitor was thus obtained (sample of Example 1).

The sample was embedded in a resin, and polished to the X-X line in FIG. 1A to expose the section SC (parallel to the LT plane), and then ion milling was performed. The first plating region 321 of the external electrodes 30 and 40 was observed with a microscope (Keyence: VHX7000). FIGS. 7A and 8 are micrographs of the sample of Example 1. In the sample of Example 1, the first plating region 321 covering the corner 25 of the ceramic body 20 was a multilayer film of three layers of Ni plating films 321*a*, 321*b*, and 321*c* (FIG. 8). No pinhole was present in the Ni plating layer 32.

The length 321R of the first plating region 321 (FIG. 5B) was measured and found to be about 55 μm.

Comparative Example 1

A sample of Comparative Example 1 was prepared by the same steps as in Example 1 except for the conditions for forming the plating layer 32 (Ni plating layer). In the sample of Comparative Example 1, the Ni plating layer 32 was plated under typical centrifugal plating conditions. As a result, the impact applied to the corner 25 of the ceramic body 20 was reduced, and the multilayering of the Ni plating layer 32 was reduced or prevented.

The second plating layer (Sn plating) was peeled off from the sample of Comparative Example 1, then the sample was processed in the same manner as in the sample of Example 1, and the corner portion of the external electrode 30 was observed with a microscope (Keyence: VHX7000). FIG. 7B is a micrograph of the sample of Comparative Example 1. In the sample of Comparative Example 1, a portion of the Ni plating layer 32 covering the corner 25 of the ceramic body 20 was thinner than other portions, and pinholes PH were generated.

In addition, 10,000 samples were prepared for each of the sample of Example 1 and the sample of Comparative Example 1, and the following evaluations were performed.

Number of samples in which plating solution has entered: The number of samples in which the plating solution has infiltrated into the Ni plating layer was counted. Sections of the external electrode 30 and the ceramic body 20 in the vicinity thereof were observed with a microscope, and when precipitation of plating or a cavity of about 1 μm or more was observed inside the external electrode 30 and/or inside the ceramic body 20, it was determined that the plating solution has infiltrated.

Reliability evaluation: IR (Insulation Resistance) measurement was performed by applying an environmental load, and the number of defective products was counted. In the IR measurement, the insulation resistance value was measured after a lapse of a certain time or more (about 24 hours or more) under a high temperature (about 70° C. or more) and high humidity (about 50% or more) environment, and it was checked whether the initial insulation resistance value was maintained. When the measured insulation resistance value exceeded 90% of the initial insulation resistance value, it was determined as OK (good product), and when the measured insulation resistance value was 90% or less, it was determined as NG (defective product).

TABLE 1

| | Comparative Example 1 | Example 1 |
|---|---|---|
| Number of samples in which plating solution has entered | 521/10000 pcs | 0/10000 pcs |
| Reliability evaluation (n = 10000) | 26/10000 pcs | 0/10000 pcs |

As shown in Table 1, in Comparative Example 1, infiltration of plating solution was confirmed in 521 samples out of 10,000 samples. On the other hand, in Example 1, infiltration of plating solution was not confirmed in the 10,000 samples.

For the reliability evaluation, in Comparative Example 1, 26 samples out of 10,000 samples were defective. In Example 1, there was no defective product in the 10,000 samples.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:

a ceramic body; and an external electrode provided at an end of the ceramic body; wherein two adjacent side surfaces and an end surface of the ceramic body are in contact with each other to define a corner of the ceramic body;

the external electrode includes a base layer covering the end surface and side surfaces including the two adjacent side surfaces except for the corner, and a plating layer covering the base layer and the corner; and the plating layer covering the corner has a thickness larger than a thickness of the plating layer covering a center of the end surface.

2. The electronic component according to claim 1, wherein the thickness of the plating layer covering the corner is about 1.5 times or more the thickness of the plating layer covering the center of the end surface.

3. The electronic component according to claim 1, wherein the plating layer covering the corner includes a multilayer film in which plating films are stacked.

4. The electronic component according to claim 3, wherein, in the multilayer film, 2 or more and 10 or less plating films are stacked.

5. The electronic component according to claim 1, wherein the plating layer covering the corner has a length of about 0.1 μm or more and about 100 μm or less along a ridge at which one of the adjacent side surfaces and the end surface are in contact with each other.

6. The electronic component according to claim 1, further comprising an internal electrode inside the ceramic body.

7. The electronic component according to claim 1, wherein the base layer includes holes therein.

8. The electronic component according to claim 7, wherein a portion of the corner is exposed through one of the holes in the base layer.

9. The electronic component according to claim 1, wherein the end surface of the ceramic body includes a plurality of corners of the ceramic body; and the plating layer which covers the plurality of corners has a thickness larger than the thickness of the plating layer covering the center of the end surface.

* * * * *